United States Patent [19]

Lutzke

[11] Patent Number: 5,009,303
[45] Date of Patent: Apr. 23, 1991

[54] AUTOMATIC CASE ACCUMULATOR

[75] Inventor: Wayne Lutzke, Plymouth, Wis.

[73] Assignee: Nigrelli Systems, Inc., Kiel, Wis.

[21] Appl. No.: 306,557

[22] Filed: Feb. 6, 1989

[51] Int. Cl.[5] ............................................. B65G 1/00
[52] U.S. Cl. ................................. 198/347.3; 198/435
[58] Field of Search ............... 198/347, 435, 469.1, 198/580, 803.12, 347.2, 347.3; 414/331; 221/86; 251/71, 126; 312/268, 348

[56] References Cited

U.S. PATENT DOCUMENTS

| | | | |
|---|---|---|---|
| 3,616,966 | 11/1971 | Schuller et al. | 221/86 X |
| 3,954,165 | 5/1976 | Snyder | 198/435 X |
| 4,251,177 | 2/1981 | Neuhaeusser et al. | 198/347 X |
| 4,273,234 | 6/1981 | Bourgeois | 198/347 |
| 4,274,530 | 6/1981 | Carter et al. | 198/347 |
| 4,499,987 | 2/1985 | Long | 198/347 |
| 4,718,536 | 1/1988 | Toby | 198/347 X |
| 4,830,170 | 5/1989 | Focke | 198/347 |

*Primary Examiner*—H. Grant Skaggs
*Assistant Examiner*—Cheryl L. Gastineau
*Attorney, Agent, or Firm*—Fuller, Ryan & Hohenfeldt

[57] ABSTRACT

An automatic case accumulator accumulates and discharges cases in conjunction with a bottle filling line. Mother cases must be accumulated when a filling run is started until filled bottles are ready to be repacked into cases associated with later-filled bottles. At the end of the filling run, the mother cases are discharged to the packing machine to be loaded with the last filled bottles. The case accumulator comprises a vertically oriented frame with chains and sprockets for holding and moving a plurality of shelves. The shelves have respective bases that are in vertical alignment with portions of a number of cases that overhang a case conveyor. Raising a shelf under the case overhaning portions lifts the cases from the conveyor. Pivotable fingers on the next higher consecutive shelf are located inside the cases to prevent the cases from tipping off the shelf bases. Case stops block case downstream transportation by the conveyor while the shelves are moving vertically to accumulate or discharge the cases.

8 Claims, 3 Drawing Sheets

AUTOMATIC CASE ACCUMULATOR

BACKGROUND OF THE INVENTION

1. Field of the Invention

This invention pertains to storage equipment, and more particularly to apparatus for temporarily storing cases until they are needed for filling with selected articles.

2. Description of the Prior Art

It is known in the bottle filling industry for a filling plant to receive supplies of empty bottles pre-packed in shipping cases. That practice is quite common when filling glass bottles. By receiving the bottles pre-packed in cases, the filling plant need not invest in case erecting machinery, which would be necessary if the cases are manufactured as flat folded paperboard blanks that must be unfolded to an open configuration suitable for receiving the bottles.

A characteristic of the pre-packed cases is that the bottles must be removed from the cases for washing and filling and then repacked into the Cases. That process requires that the mother cases (the cases associated with the first quantity of bottles to enter the filling line at the beginning of a filling run) must be temporarily stored. As many mother cases must be stored as are required to hold enough bottles to initially fill the filling line with bottles. In some operations, it may be as long as 45 minutes from the time the initial bottles enter the filling line until they emerge. Consequently, all the cases corresponding to the bottles that can be processed during that time must be temporarily stored. When the initial bottles emerge from the downstream end of the filling line, the cases associated with the upstream bottles then entering the line are unloaded and immediately conveyed to receive compliments of the initially filled bottles in known manner. However, the initially stored mother cases must remained stored in the vicinity of the filling line until the filling run is completed. Only at that time are the mother cases needed to receive the last quantity of bottles that leave the filling line after the filling run.

A problem related to supplying bottles and cases together to a bottling plant concerns the accumulation of bottles between the upstream and downstream ends of the filling line. Typically the operation of repacking the bottles into the shipping cases is faster than the washing and filling operations. Consequently, it is common to accumulate bottles in the filling line, and only later send them to the case packing station. The result is that the cases associated with the accumulated bottles must also be temporarily stored until the bottles are discharged from the accumulation station. Related to the bottle accumulation practice are problems associated with faulty washing or filling operations. Equipment jams, bottle breakage, and similar malfunctions may temporarily reduce the need for a continuous flow of cases to the packing station.

Prior methods for handling the mother cases are generally unsatisfactory. One prior method is to stack off the cases from the case conveyor and store them near by. At the end of the filling run, the cases are reloaded onto the case conveyor to intercept complements of bottles at the packing station. Fork lift trucks and pallets are often used in prior stack off processes. That practice is wasteful of both manpower and storage space. Prior practices also demand additional manpower to constantly match the case supply to the actual bottle requirements, which vary because of upstream bottle accumulation and/or equipment malfunction.

Thus, a need exists for improved means for temporarily storing cases associated with bottle filling lines.

SUMMARY OF THE INVENTION

In accordance with the present invention, an automatic case accumulator is provided that temporarily accumulates container cases at the beginning of a container filling run and discharges the cases at the end of the run. This is accomplished by apparatus that includes a series of vertically spaced horizontal shelves that move vertically to lift cases from and deposit them onto a case conveyor.

The shelves are supported on a sturdy vertically oriented frame. The frame is placed adjacent the conveyor that transports cases in a downstream direction to a station that packs the filled containers into the cases. The frame shelves extend for the desired length along the case conveyor. Mounted to the frame for rotation about respective axes parallel to the motion of the case conveyor are suitable sprockets. Chains are trained over the sprockets. The horizontal shelves extend between and are supported by the chains for movement in a generally vertical plane. The shelves are vertically spaced apart a distance somewhat greater than the height of the cases. The vertical plane of the shelves is located perpendicular to and adjacent one edge of the case conveyor. The cases are positioned on the conveyor such that portions thereof, including respective side panels, overhang the conveyor, with the overhanging portions lying in the plane of the shelves.

The automatic case accumulator of the present invention includes a number of fingers mounted to the underside of each shelf. The fingers are free to rotate about respective horizontal axis in a plane parallel to the direction of the case conveyor motion, but they cannot rotate in a plane perpendicular to the direction of case conveyor motion. Normally, the fingers dangle in a vertical attitude under the influence of gravity. The fingers are spaced longitudinally along the shelves at intervals corresponding to an integral number of cases spaced along the shelves.

The automatic case accumulator further comprises a pair of automatic case stops. A first case stop is located at the upstream end of the shelves, with the second case stop being located at the downstream end. The case stops are positionable between respective retracted positions where they are retracted away from the case conveyor, and extended positions where they extend across the case conveyor to block transportation of the cases in the downstream direction.

The automatic case accumulator is operable in a first mode in which cases are transported downstream past the accumulator to the packing station. In the first mode of operation, a selected shelf is positioned slightly under the plane of the case conveyor. Both case stops are placed in their respective retracted positions. The cases being transported downstream by the conveyor pass generally between the selected shelf and the next higher shelf. The leading and trailing panels of the cases strike and rotate the fingers suspended from the next higher shelf. After a case leading or trailing panel has passed the finger, the finger returns by gravity to the generally vertical attitude. The fingers are located transversely relative to the cases so as to lie adjacent and inside their respective side panels that overhang the case conveyor.

The automatic case accumulator is operable in a second mode in which cases are lifted from the conveyor and temporarily stored. For that purpose, the case stops are controlled to their respective extended positions as the cases are transported downstream. Transportation of the cases is blocked, and a quantity of cases is captured between the two case stops. The accumulator control operates to index the shelves in the upward direction and cause the selected shelf to rise under the overhanging portions of the captured cases and lift them off the conveyor. The dangling fingers adjacent the inside panels of the respective cases prevent the cases from tipping off the shelf. The length of the shelves determines the quantity of cases lifted off the conveyor.

The shelves are indexed upwardly until the next lower shelf under the selected shelf is slightly below the plane of the case conveyor. The case stops retract. The cases upstream of the accumulator are then transported downstream again by the conveyor. If desired, the accumulator can remain in the first mode of operation to allow cases to be transported to the packing station. Alternately, the case stops can again be actuated to their extended positions as soon as a new batch of cases overlies the newly selected shelf. Then the newly captured cases are lifted off the conveyor. In that manner, the accumulator can intercept and accumulate as many cases as desired as they are transported downstream by the conveyor.

Further in accordance with the present invention, the accumulator is operable in a third mode that discharges accumulated cases back onto the conveyor. In the third mode of operation, the accumulator upstream case stop is extended to block downstream transportation of any upstream cases. The control indexes the shelf immediately above the conveyor downwardly to deposit the cases supported by that shelf onto the conveyor. The conveyor then transports the discharged cases downstream to the packing station, with the moving cases pivoting the fingers on the next higher shelf out of the way. By sequentially indexing the shelves as many cases as desired can be discharged. After a particular shelf has been unloaded, if desired the upstream case stop can be retracted and the upstream cases transported downstream by the conveyor to the packing station under the first mode of operation. In that way a large number of cases can be accumulated with minimum use of floor space, and the cases are always at hand for supplying the packing station when needed.

Other objects and advantages of the invention will become apparent to those skilled in the art upon reading the disclosure.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
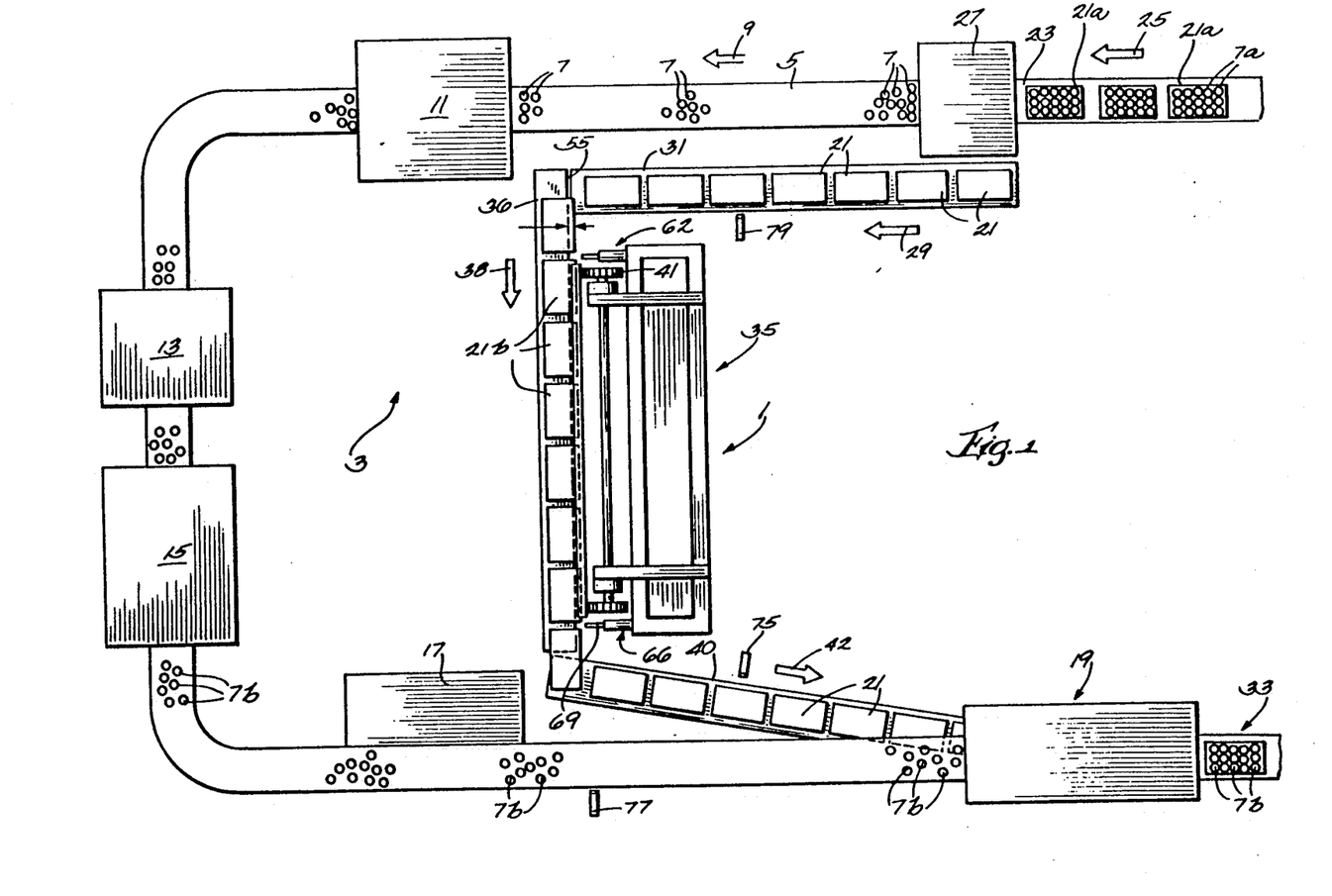
FIG. 1 is a schematic top view of a typical bottle filling line that advantageously includes the automatic case accumulator of the present invention.

Referring to FIG. 1, reference numeral 1 indicates the automatic case accumulator of the present invention. The automatic case accumulator is particularly useful in combination with a glass bottle filling line 3, but it will be understood that the invention is not limited to container filling applications.

The bottle filling line 3 depicted is merely representative of a wide variety of equipment type and placement for filling bottles or other containers with food or other products. The empty containers in the form of glass bottles 7a are normally supplied to the bottling plant pre-packed in suitable open top cases 21a. A conveyor section 23 transports the cases 21a loaded with empty bottles 7a in the direction of arrow 25 to a bottle unloading station 27. At the bottle unloading station 27, the bottles 7a are removed from the cases 21a. The unloaded bottles, designated by reference numerals 7, are propelled downstream in the direction of arrow 9 by a conveyor schematically represented by reference numeral 5.

In the particular filling line 3 shown, the bottles 7 pass through a washer 11, a filling machine 13, and a sterilizer 15, as is known in the art. The filling line may also include a bottle accumulation station 17, Where the filled and sterilized bottles 7b may be held temporarily before being propelled to a packing station 19.

After the bottles 7a are removed from the cases 21a, the empty cases 21 are transported in a downstream direction 29 by a conveyor section schematically represented at reference numeral 31 toward the packing station 19. At the packing station, the filled bottles 7b are grouped into complements of the desired number and are inserted back into the empty cases 21 to create loaded cases 33 containing the filled bottles. In the particular installation illustrated, the cases 21 are transported from the conveyor section 31 to a second downstream conveyor section 36. As they are transferred from the conveyor section 31 to the conveyor section 36, the cases are placed on the conveyor section 36 so that they overhang the inside edge 55 thereof by a distance X. The conveyor section 36 transports the cases in the downstream direction 38 to another representative conveyor section 40. The conveyor section 40 transports the cases in the direction of arrow 42 to the packing station 19.

In accordance with the present invention, the automatic case accumulator 1 is interposed in the path of the empty cases 21 between the bottle unloading station 27 and the packer 19. The case accumulator functions to intercept and temporarily store a number of empty cases 21 that correspond to the number of bottles 7 and 7b that are in the filling line 3 between the unloading station 27 and the packing station 19. As with the general layout and arrangement of the various other components of the illustrated filling line, the case accumulator may be installed at any suitable location along the path of the cases between the unloading station 27 and the packing machine 19; the particular location shown along conveyor section 36 is for illustrative purposes only.

Figure 2:
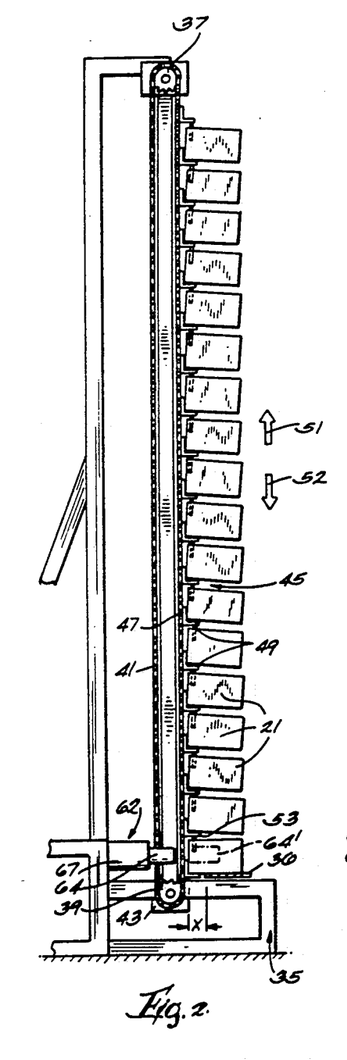
FIG. 2 is an enlarged side view of the automatic case accumulator of the present invention.
Figure 3:
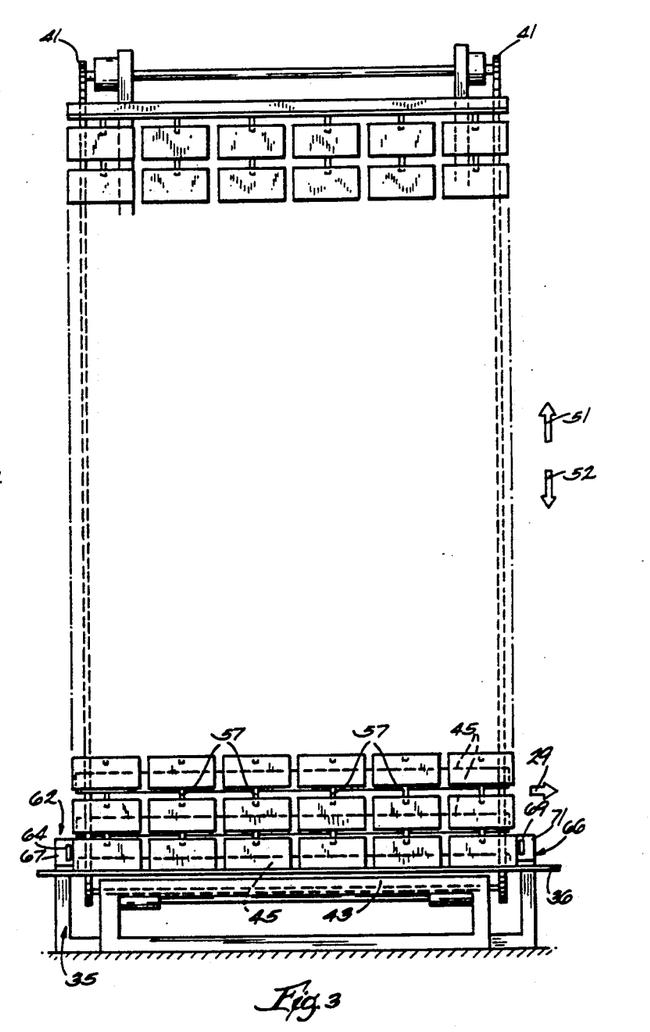
FIG. 3 is a front view of FIG. 2.

Looking also at FIGS. 2 and 3, the automatic case accumulator 1 comprises a sturdy frame 35 that lies in a generally vertical plane adjacent the conveyor section 36. Mounted to the frame 35 are two or more sets of upper sprockets 37 with corresponding lower sprockets 39. Trained over the associated sets of upper and lower sprockets 37 and 39, respectively, are respective chains 41. The sprockets and chains 41 are driven in unison by a suitable drive mechanism 43.

Mounted horizontally between the chains 41 on the front side of the frame 35, i.e., toward the conveyor section 36, are a series of vertically spaced shelves 45. The shelves 45 are L-shaped in transverse cross-section. Each shelf has a vertically oriented leg 47 that is attached to the chains 41 and a horizontally oriented base 49. The vertical spacing between consecutive shelf bases 49 is greater than the height of the cases 21, as will be explained. In FIGS. 1 and 3, the shelves 45, as well as the frame 35, have a length parallel to the conveyor section 36 that is approximately the same length as six cases 21. However, the shelves may be as long as desired to suit the particular requirements of the bottling line 3. Moreover, the height of the frame 35 can be any height commensurate with the ceiling limitations at the installation site. Thus, the particular structure shown in the drawings is intended to be representative of a typical installation and not to limit the invention to that specific construction.

By operation of the drive mechanism 43, the chains raise and lower the shelves 45, as is indicated by arrows 51 and 52, respectively. To enable the shelves to pass over the sprockets 37 and 39, the respective legs 47 are pivotably attached to the chains. The accumulator frame 35, chains 41, and shelves are so located relative to the conveyor section 36 that the free ends 53 of the shelf bases 49 form a vertical plane that passes in close proximity to the inside edge 55 of the conveyor section 36. Thus, the shelf bases 49 are capable of vertical motion through the area that corresponds to the overhanging distance X of the cases 21.

Pivotally attached to the underside of each shelf 49 are a series of fingers 57. Each finger 57 is supported for pivotal movement about a pin 59 that is held between a pair of L-shaped brackets 61 See FIGS. 4 and 5. The brackets 61 and pins 59 are arranged such that the fingers can pivot only in a plane that is parallel to the direction of the case motion 38. The fingers are spaced transversely a short distance from the plane of the shelf vertical legs 47. The fingers pivot freely, so that normally they downwardly depend by gravity in a generally vertical attitude. The vertical spacing between the base of a shelf and the closest point thereto on the brackets of the next higher consecutive shelf is greater than the height of the cases 21. The fingers are located longitudinally along the respective shelves 45 such that a minimum of one finger per case is aligned at approximately the midpoint of each case 21. At times two fingers per case are used depending on length of case to allow for variation in case sizes. There should be finger spacing to accommodate the smallest length cases.

To control the flow of cases 21 along the conveyor section 36, the automatic case accumulator 1 includes a pair of automatic case stops. As best shown in FIGS. 1 and 3, a first case stop 62 is located at the upstream end of the accumulator, and a second case stop 66 is located at the accumulator downstream end. The case stops 62 and 66 may be of various designs, such as arms that rotate into and out of the path of the cases. In the illustrated construction, the case stops are substantially identical, and they comprise plunger type arms 64 and 69 that extend and retract generally horizontally across the case path. The arms 64 and 69 are reciprocatingly supported within respective housings 67 and 71 fixed to the frame 35. The arms 64 and 69 may be actuated by conventional motion producing means, such as air cylinders or electric solenoids. The arms are reciprocable between respective positions as shown by the solid lines 64 of FIGS. 1 and 2 and extended positions as shown by the phantom lines 64' of FIG. 2. In the retracted positions, the arms allow the cases 21 to be transported downstream by the conveyor section 36. In the extended positions, the arms block case motion, so that the conveyor merely slides under the cases.

Figure 4:
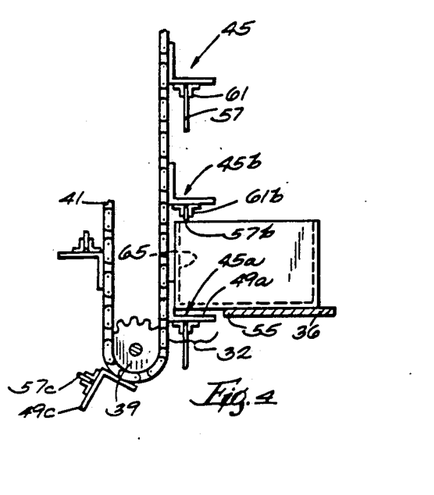
FIG. 4 is an enlarged side view of a case passing through the automatic case accumulator.
Figure 5:
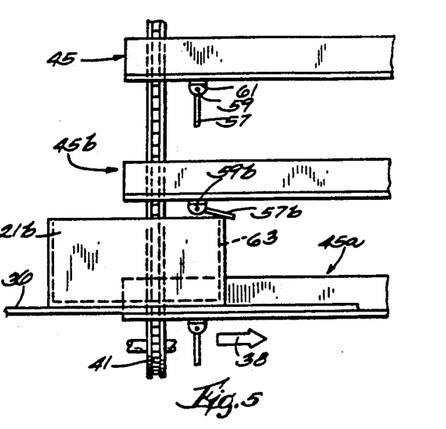
FIG. 5 is a front view FIG. 4.
Figure 6:
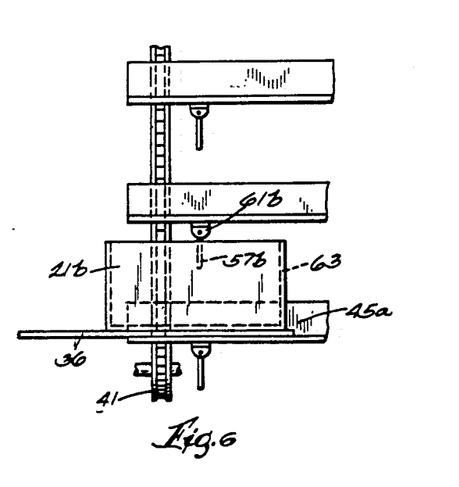
FIG. 6 is a view similar to FIG. 5, but showing a case in position to be lifted by the automatic case accumulator.
Figure 8:
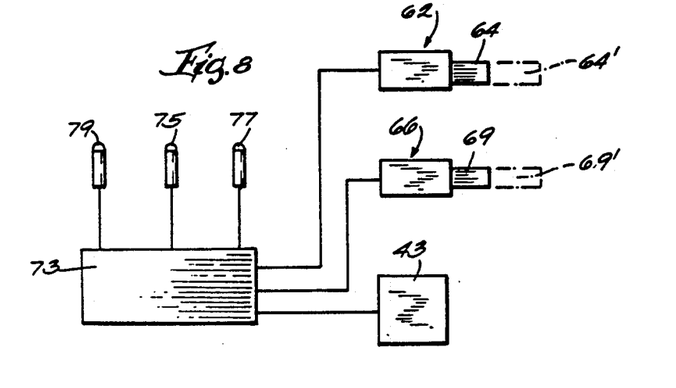
FIG. 8 is a schematic diagram of the system employed to control the automatic case accumulator of the present invention.

The drive mechanism 43 and the case stops 62 and 66 are actuated by a suitable control 73 to operate the automatic case accumulator 1 in any of three modes. See FIG. 8. In the first mode of operation, as best shown in FIGS. 4 and 5, the drive mechanism 43 actuates the sprockets 37 and 39 and the chains 41 to index a selected shelf, such as shelf 45a, such that the base 49a thereof is slightly below the plane of the conveyor section 36. In addition, the control 73 actuates the automatic case stops 62 and 66 to their respective retracted positions. Consequently, the conveyor section 36 can transport empty cases 21 past the accumulator in the downstream direction 29, with the cases passing between consecutive shelves 45a and 45b. As the cases 21 pass along the accumulator, the leading panels 63 of the consecutive cases strike the fingers of the next higher shelf, such as fingers 57b on shelf 45b. The case leading panels 63 pivot the fingers out and above the leading panels, and the cases pass under the brackets 61b. Continued downstream motion ultimately allows the leading panels to break contact with the respective fingers. The fingers then swing by gravity to a vertical attitude, FIG. 6, where they are again struck and pivoted by the cases' respective trailing panels 68. The fingers are located transversely on the shelves such that the inside panels 65 of the cases pass between the fingers and the shelf vertical leg 47.

In the second mode of operation, the automatic case accumulator 1 is actuated to block downstream motion of the cases 21 and to index the shelves 45 vertically upwardly in the direction of arrow 51. The control 73 actuates the automatic case stops 62 and 66 to their respective extended positions, as shown by the phantom lines 64' and 69'. Consequently all the cases upstream of the downstream case stop 66 are blocked and stationary, with the cases between the two case stops being stationarily captured. The fingers 57 are positioned along the shelf 45b such that a finger 57b is dangling freely adjacent and approximately at the midpoint of the back panel 65 of each case. Looking at FIGS. 4 and 6, it will be understood that additional cases are adjacent case 21b along the accumulator.

Figure 7:
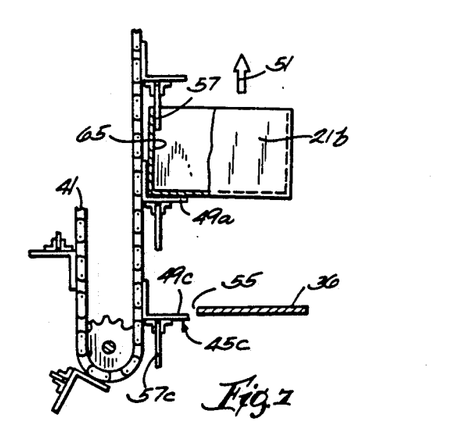
FIG. 7 is a view similar to FIG. 4, but showing the automatic case accumulator in operation to lift a quantity of cases from the case conveyor.

The control 73 next operates the drive mechanism 43 to drive the sprockets 37 and 39 and chains 41 to raise the shelves 45 in the upward direction of arrow 51, FIG. 7. The shelf base 49a passes adjacent the conveyor section inner edge 55, contacts the underside of the cases 21b, and raises them off the conveyor section 36.

Since the cases 21b overhang the shelf base 49a by a substantial amount, the cases tend to tip off the shelf 45a. However, as the cases tip, their back panels 65 contact the respective fingers 57b dangling inside. The fingers, being unable to pivot in planes perpendicular to the motion of the conveyor section 36, provide reaction forces against the respective back panels to hold the cases on the shelf. To accommodate any variation in the placement of the cases on the conveyor section 36, the fingers are spaced from the shelf vertical leg 47 a sufficient distance to allow the cases to tip somewhat until the case back panels strike the respective fingers.

After the shelf 45a raises the cases 21b off the conveyor section 36, the control 73 continues to raise the shelves until the base 49c of the next adjacent shelf 45c is slightly below the plane of the conveyor section. The control then returns to the first mode of operation, stopping the motion of the drive mechanism 43 and retracting both case stop arms 64 and 69. The cases again flow past the accumulator 1 on the conveyor section 36. The result is that a quantity of cases is stored in the case accumulator 1 above the case path between the unloading station 27 and the packing station 19, FIG. 1. When it is desired to store another batch of cases, the foregoing procedure is repeated. The control 73 extends the arms 64 and 69 and operates the drive 43 to raise the shelf 45c and lift the associated cases captured between the two case stops off the conveyor section 36. In that manner, as many cases can be accumulated between the case unloading station and case packer as are necessary to suit the quantity of bottles 7 and 7b in the filling line 3 between the unloading station and the packer.

When there are insufficient cases 21 upstream of the automatic case accumulator 1 to satisfy the requirements of the bottles 7b entering the packer 19, the accumulator undergoes the third mode of operation. In the third mode, the control 73 actuates the upstream case stop 62 to extend the arm 64 to the extended position 64'. Consequently, any cases upstream of the arm 64 are blocked from downstream movement. The control 73 next actuates the drive mechanism 43 to lower the shelves 45 toward the conveyor section 36 and deposit the cases on a shelf, such as shelf 45b, onto the conveyor. The conveyor section immediately transports the deposited cases downstream to the packer, with the cases pivoting and passing by the fingers 57 on the adjacent higher shelf. If additional cases are needed from the accumulator at the packer, the upstream case stop arm remains extended and the shelves are sequentially indexed lower to deposit the cases of as many shelves as desired onto the conveyor section 36.

To provide signals to the control 73 for operating the automatic case accumulator 1, the present invention includes a trio of sensors. Looking at FIGS. 1 and 8, a first sensor 75 is located between the accumulator and the packing station 19. A second sensor 77 is located in the filling line 3 upstream of the packing station. Sensors 75 and 77 sense the movement of the cases 21 and bottles 7b, respectively. Signals from the sensors are interpreted by the control 73 to indicate the presence of bottles and cases as they are about to enter the packing station. Similarly, sensor 79 senses the presence of cases upstream of the accumulator. As long as only the proper quantity of cases to satisfy the bottles about to enter the packer are upstream of the accumulator, the control operates the accumulator to the first mode of operation. Should a potential case backup condition occur at the packer, the control operates the accumulator to the second mode of operation to accumulate cases. When the sensor 79 senses insufficient cases upstream from the accumulator to satisfy the bottles arriving at the packing station, the control actuates the accumulator to the third mode of operation to discharge stored cases onto the conveyor section 36. The control is thus able to operate the accumulator between the first, second, and third modes of operation to always have a case ready to receive a complement of filled bottles at the packing machine 19.

The versatility of the present invention is particularly important to accommodate case needs during varying bottle flow rates through the filling line 3. The sensor 77 senses any interruptions in the flow of filled bottles 7b, and the control 73 operates the accumulator 1 to automatically store the cases corresponding to gaps in the filled bottles on the conveyor 5. When the filling line problems are resolved and downstream motion of bottles is resumed, the accumulated cases 21b are discharged back onto the conveyor section 36.

As many accumulators 1 as desired may be placed in the case line between the unloading station 27 and the packing station 19. Further, the accumulators can be located next to each other or on opposite sides of the conveyor section 36, depending upon installation requirements.

Thus, it is apparent that there has been provided, in accordance with the invention, an automatic case accumulator that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

I claim:

1. An automatic case accumulator for selectively accumulating and discharging cases transported in a downstream direction by a conveyor comprising:
   a. a frame;
   b. a plurality of generally horizontal vertically spaced shelves extending generally parallel to the conveyor;
   c. drive means connected to the frame for moving the shelves in a generally vertical plane located adjacent and parallel to the conveyor; and
   d. finger means mounted to the shelves for being struck and pivoted within the vertical plane by the cases being transported in the downstream direction by the conveyor between consecutively spaced shelves to insert the finger means inside the cases and for cooperating with selected shelves to lift the cases from the conveyor without the cases tipping off the selected shelves.

2. The automatic case accumulator of claim 1 wherein:
   a. each shelf comprises a generally horizontal base;
   b. the finger means comprises at least one finger pivotally mounted to the underside of each shelf base; and
   c. the base of a selected shelf and the finger means on the next consecutive higher shelf cooperate to lift a case from the conveyor without the case tipping off the selected shelf when the drive means moves the shelves in a generally vertical upward direction.

3. In combination with a conveyor for transporting cases in a downstream direction, the conveyor having a longitudinally extending inside edge and the cases having respective portions that overhang the conveyor inside edge, the cases having respective leading and inside panels, an automatic case accumulator comprising:
a. a frame located only proximate the conveyor inside edge; and
b. shelf means supported by the frame for movement in a vertical plane only adjacent the conveyor inside edge and generally parallel to the conveyor downstream direction to lift cases off the conveyor when the shelf means moves in an upward direction wherein the shelf means comprises:
  i. a plurality of elongated vertically aligned shelves having spaces between consecutive shelves sufficient for the cases to be transported therebetween, each shelf comprising:
    a vertical leg;
    a horizontal base attached to the shelf vertical leg and passing adjacent the conveyor inside edge when the shelf moves in the vertical plane, the shelf base lying in a plane that is generally coincident with the portions of the cases that overhang the conveyor inside edge; and
    finger means pivotally mounted to the horizontal base of each shelf for cooperating with the next lower consecutive shelf to lift the cases without tipping off the conveyor; and
  ii. drive means supported by the frame for moving the shelves in the vertical plane to lift the cases off the conveyor when the shelves move in the upward direction past the conveyor.

4. In combination with a conveyor for transporting cases in a downstream direction, the conveyor having a longitudinally extending inside edge and the cases having respective portions that overhang the conveyor inside edge, the cases having respective leading and inside panels, an automatic case accumulator comprising:
a. a frame located proximate the conveyor; and
b. shelf means supported by the frame for movement in a vertical plane adjacent the conveyor inside edge and generally parallel to the conveyor downstream direction to lift cases off the conveyor when the shelf means moves in an upward direction, wherein the shelf means comprises:
  i. a plurality of elongated generally horizontal shelves having vertical spacings between consecutive shelves sufficient to permit the cases to be transported therebetween, wherein each shelf comprises a generally horizontal base that contacts the overhanging portions of the cases on the conveyor when the drive means moves the shelves in the upward direction, a plurality of fingers, and bracket means mounted to the underside of the shelf base for supporting the respective fingers to pivot only in a plane generally coincident with the vertical plane, the fingers having respective generally vertical dangling normal attitudes, wherein the fingers are located in the path of the cases transported by the conveyor to thereby be struck and pivoted by the leading panels of the cases, the fingers returning to the dangling attitude inside the cases proximate the inside panels of the respective cases after the respective case leading edges have passed thereby; and
  ii. drive means supported by the frame for moving the shelves in the vertical plane,
so that the inside panels of the cases lifted by the shelves are restrained by the respective fingers to prevent the cases from tipping off the shelf base when the shelf lifts the cases off the conveyor.

5. Apparatus for selectively accumulating and discharging cases having respective inside and leading panels comprising:
a. an elongated conveyor having an inside edge for transporting the cases in a downstream direction, the conveyor supporting the cases with the inside panels thereof overhanging the conveyor inside edge;
b. a frame located only adjacent the conveyor inside edge; and
c. shelf means supported by the frame for movement in a generally vertical plane adjacent the conveyor inside edge to selectively lift cases off and deposit cases onto the conveyor, wherein the shelf means comprises:
  i. a plurality of vertically spaced shelves, having respective generally horizontal bases located in the same general plane as the inside panels of the cases;
  ii. finger means mounted to the underside of each shelf base for cooperating with the next lower consecutive shelf to lift the cases off and deposit cases onto the conveyor without the cases tipping off the next lower consecutive shelf; and 6. Apparatus for selectively accumulating and discharging cases having respective inside and leading panels comprising:
a. an elongated conveyor having an inside edge for transporting the cases in a downstream direction, the conveyor supporting the cases with the inside panels thereof overhanging the conveyor inside edge;
b. a frame located adjacent the conveyor inside edge; and
c. shelf means supported by the frame for movement in a generally vertical plane adjacent the conveyor inside edge to selectively lift cases off and deposit cases onto the conveyor, wherein the shelf means comprises:
  i. a plurality of shelves having respective generally horizontal bases located in the same general plane as the inside panels of the cases;
  ii. finger means mounted to the underside of each shelf base for cooperating with the next lower consecutive shelf to lift the cases off and deposit cases onto the conveyor, the finger means comprising at least one finger, and bracket means mounted to the underside of each shelf base for supporting the finger in the path of the cases transported by the conveyor to pivot generally within the vertical plane about a generally vertical dangling attitude, wherein the finger is proximate a case inside panel when the case leading panel is downstream of the finger and the finger is in the dangling attitude; and iii. drive means supported by the frame for moving the shelves in the vertical plane, so that the finger restrains the case from tipping off the next lower consecutive shelf base when the drive means operates the shelves to move upwardly and lift the case from the conveyor.

7. A method of accumulating a quantity of cases having respective inside panels comprising the steps of:

a. providing a plurality of vertically spaced shelves having respective lengths corresponding to a selected number of cases;

b. transporting the cases on a conveyor in a downstream direction generally between two consecutively spaced shelves;

c. blocking the flow of the cases at the upstream and downstream ends of the shelves;

d. moving the shelves in an upward direction to contact the cases under their respective inside panels and to lift the cases off the conveyor and support them on the shelves;

e. mounting a number of fingers to the underside of each shelf in the path of the cases corresponding to the number of cases supportable on the shelves;

f. striking and pivoting the fingers with the cases as the cases are transported between the consecutively spaced shelves; and g. pivoting the struck fingers to respective generally vertical attitudes inside the respective cases and adjacent the respective inside panels thereof, so that the fingers do not impede transportation of the cases between the shelves and the fingers cooperated with the next lower shelf to lift the cases without tipping from the conveyor when transportation of the cases is blocked and the shelves are moved in the upward direction.

8. A method of selectively accumulating and discharging cases being transferred between two stations comprising the steps of:

a. providing a plurality of generally horizontal shelves having respective bases, the shelves being spaced apart a distance greater than the height of the cases;

b. providing a conveyor for transporting the cases in a downstream direction between two consecutively spaced shelves;

c. providing first and second case stops at the upstream and downstream ends, respectively, of the shelves;

d. controlling the shelves and case stops in a first mode of operation comprising the steps of:

i. retracting the case stops away from the conveyor; and ii. moving the shelves to a position at which a selected shelf base is slightly below the conveyor to enable the conveyor to transport the cases in the downstream direction between the selected shelf base and the base of the of the next consecutive higher shelf;

e. controlling the shelves and case stops in a second mode of operation comprising the steps of:

i. extending the case stops to block downstream transportation of the cases and to capture a selected number of cases between the first and second case stops;

ii. moving the shelves upwardly; and iii. lifting the cases between the first and second case stops off the conveyor with a selected shelf to thereby accumulate the cases on the shelf;

f. mounting a number of pivotable fingers to the underside of each shelf base at least equal to the selected number of cases;

g. striking and pivoting the fingers with the cases to a generally horizontal attitude as the conveyor transports the cases between consecutively spaced shelf bases; and h. pivoting the fingers to respective generally vertical attitudes inside the cases when the case stops are extended to capture the selected number of cases therebetween, so that the fingers cooperated with the shelf base to lift the cases off the conveyor without the cases tipping off the shelf base.

* * * * *

UNITED STATES PATENT AND TRADEMARK OFFICE
CERTIFICATE OF CORRECTION

PATENT NO. : 5,009,303
DATED : April 23, 1991
INVENTOR(S) : Wayne Lutzke

It is certified that error appears in the above—identified patent and that said Letters Patent is hereby corrected as shown below:

Column 10, line 37:
    After "and" insert a new line:
        --- iii. drive means supported by the frame for moving the shelves in the vertical plane. ---

Column 11, lines 33 and 34:
    Delete "cooperated" and substitute --- cooperate ---.

Column 12, line 40:
    Delete "cooperated" and substitute --- cooperate ---.

Signed and Sealed this

Twenty-ninth Day of September, 1992

Attest:

DOUGLAS B. COMER

Attesting Officer    Acting Commissioner of Patents and Trademarks